US011275384B2

(12) United States Patent
Umeda

(10) Patent No.: US 11,275,384 B2
(45) Date of Patent: Mar. 15, 2022

(54) OPERATION CONTROL APPARATUS AND VEHICLE

(71) Applicant: TOYOTA JIDOSHA KABUSHIKI KAISHA, Toyota (JP)

(72) Inventor: Kazuhiro Umeda, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 16/807,314

(22) Filed: Mar. 3, 2020

(65) Prior Publication Data
US 2020/0301442 A1 Sep. 24, 2020

(30) Foreign Application Priority Data
Mar. 20, 2019 (JP) .............................. JP2019-053370

(51) Int. Cl.
*B60W 30/00* (2006.01)
*G05D 1/02* (2020.01)
*G08G 1/123* (2006.01)
*B61L 23/22* (2006.01)

(52) U.S. Cl.
CPC ......... *G05D 1/0287* (2013.01); *G05D 1/0276* (2013.01); *G08G 1/123* (2013.01); *G05D 2201/0213* (2013.01)

(58) Field of Classification Search
CPC ........ B60W 30/00; B61L 23/22; B06Q 50/00; B06Q 50/30
See application file for complete search history.

(56) References Cited

U.S. PATENT DOCUMENTS

| 10,895,463 | B1* | 1/2021 | Cope ................... G01C 21/3484 |
| 2019/0387060 | A1* | 12/2019 | Kentley-Klay ....... H04L 67/306 |
| 2020/0055530 | A1* | 2/2020 | Malik ........................ B61K 1/00 |
| 2020/0100057 | A1* | 3/2020 | Galon ................ G01C 21/3679 |
| 2020/0262300 | A1* | 8/2020 | Tokumaru ............... B60L 15/40 |
| 2020/0272954 | A1* | 8/2020 | Serra ........................ G08G 1/20 |

FOREIGN PATENT DOCUMENTS

JP 2000-264210 A 9/2000

OTHER PUBLICATIONS

Zhang Jian et al., "Causes and forecast modeling of conventional bus bunching," Journal of Southeast University (Natural Science Edition), 46(6), Nov. 2017, 1269-1273.
Partial English Translation of Office Action dated Jan. 15, 2021 issued in corresponding Chinese patent application No. 202010190662.5.

* cited by examiner

Primary Examiner — Tan Q Nguyen
(74) Attorney, Agent, or Firm — Oblon, McClelland, Maier & Neustadt, L.L.P.

(57) ABSTRACT

An operation control apparatus is for a plurality of vehicles traveling in a self-driving manner on a cyclic route having a plurality of stop points. The operation control apparatus includes a controller that acquires vehicle interval information between a preceding vehicle and a succeeding vehicle, based on a time period of a stop of the preceding vehicle at a stop point and a distance from the succeeding vehicle to the stop point when the preceding vehicle is stopping at the stop point, and controls the plurality of vehicles based on the information.

9 Claims, 4 Drawing Sheets

FIG. 4

| TIME | t0 | t1 | t2 | t3 | t4 | t5 | ... |
|---|---|---|---|---|---|---|---|
| OTHER VEHICLE 140A | XA0, YA0 | XA1, YA1 | XA2, YA2 | XA3, YA3 | XA4, YA4 | XA5, YA5 | ... |
| OTHER VEHICLE 140B | XB0, YB0 | XB1, YB1 | XB2, YB2 | XB3, YB3 | XB4, YB4 | XB5, YB5 | ... |
| ... | ... | ... | ... | ... | ... | ... | ... |

OPERATION CONTROL APPARATUS AND VEHICLE

INCORPORATION BY REFERENCE

The disclosure of Japanese Patent Application No. 2019-053370 filed on Mar. 20, 2019 including the specification, drawings and abstract is incorporated herein by reference in its entirety.

BACKGROUND

1. Technical Field

The disclosure relates to an operation control apparatus and a vehicle.

2. Description of Related Art

Japanese Patent Application Publication No. 2000-264210 discloses a vehicle traffic system for enhancing flexibility in transportation using vehicles traveling along a cyclic route. The document describes that self-driving control is performed for each vehicle to arrive at a specified point at a specified time.

SUMMARY

When a plurality of vehicles traveling in a self-driving manner along a cyclic route are caused to travel, it is conceivable to control vehicle intervals between each pair of the vehicles traveling apart from each other on the cyclic route. However, there is not a known method for acquiring a vehicle interval taking into consideration a plurality of stop points such as stations or bus stops for allowing passengers to board along such a cyclic route. For example, JP 2000-264210 A only describes that the plurality of vehicles are operated by specifying a driving interval.

Accordingly, an object of the disclosure is to provide an operation control apparatus and a vehicle that make it possible to acquire a vehicle interval taking into consideration a stop point such as a station or a bus stop.

The disclosure relates to an operation control apparatus for a plurality of vehicles traveling in a self-driving manner on a cyclic route having a plurality of stop points. The vehicles may be automobiles, or may be trains. The operation control apparatus includes a vehicle interval acquirer that acquires vehicle interval information between a preceding vehicle that is a preceding one of the vehicles and a succeeding vehicle that is one of the vehicles succeeding the preceding vehicle, based on a time period of a stop of the preceding vehicle at a stop point among the stop points and a distance from the succeeding vehicle to the stop point when the preceding vehicle is stopping at the stop point, and based on a time period of a stop of the succeeding vehicle at a stop point among the stop points, a standard time period of a stop preset for the stop point, and a distance from the stop point to the preceding vehicle when the succeeding vehicle is stopping at the stop point; and a controller that controls the plurality of vehicles based on the vehicle interval information.

Accordingly, it is possible to acquire the vehicle interval information based on not only the distance from the succeeding vehicle to the stop point but also the time period of the stop of the preceding vehicle at the stop point.

Here, information indicating a time period required for the succeeding vehicle to arrive at the stop point is acquired based on the distance from the succeeding vehicle to the stop point, and the vehicle interval information may be acquired based on the information and information indicating the time period of the stop of the preceding vehicle at the stop point.

The time period of the stop of the preceding vehicle at the stop point is converted into distance information based on the time period of the stop, and the vehicle interval information may be acquired based on a distance indicated by the distance information and the distance from the succeeding vehicle to the stop point. For example, assuming that a route having a virtual distance obtained by multiplying the standard time period of a stop set for the stop point by a vehicle standard speed is set from the stop point, the distance information may be information indicating a distance obtained by multiplying the time period of the stop by the vehicle standard speed.

Even when the succeeding vehicle is stopping at the stop point, in order to acquire the vehicle interval information, information indicating a time period is converted into information indicating a distance, or information indicating a distance is converted into information indicating a time period, and information indicating a vehicle interval based on both the information indicating a time period and the information indicating a distance can be acquired.

A stop point is a point where a vehicle practically makes no advance along the cyclic route. Accordingly, the stop points include a bus stop, a station, a turn point, and the like.

Note that the vehicle interval acquirer may be configured to be able to acquire at least three pieces of the vehicle interval information when the number of vehicles traveling on the cyclic route is n (n is an integer not smaller than 4), and the operation control apparatus may further includes a transmitter configured to be able to transmit, to each of the plurality of vehicles, future time information acquired based on the acquired vehicle interval information, and position information indicating a target position of the vehicle at a time indicated by the time information.

By making a configuration such that at least three pieces of the vehicle interval information can be acquired, not only the vehicle interval information between the preceding and succeeding vehicles but also vehicle interval information at a far position on the cyclic route can be acquired. Since the future time information acquired based on the acquired vehicle interval information and the position information indicating a target position of a relevant vehicle at a time indicated by the time information can be transmitted to each of the plurality of vehicles, vehicle control with higher accuracy can be achieved.

The operation control apparatus may further include: a position information acquirer that acquires position information on each of the plurality of vehicles; an acquirer that acquires, for each of the plurality of vehicles, arrival time period information on a time period required for the vehicle to arrive at a stop point existing forward of the vehicle; and a second transmitter configured to be able to transmit the arrival time period information to an information terminal owned by a user of the vehicle.

Note that the disclosure relates to an information provision apparatus for providing information related to a plurality of vehicles traveling in a self-driving manner on a cyclic route having a plurality of stop points to an information terminal owned by each user of the vehicles. The information provision apparatus can output time period information on a time period required for any vehicle of the vehicles to arrive at one of the stop points, in order to allow the information terminal owned by a user of the vehicle to display the time period information, wherein the vehicles are controlled by an operation control apparatus including a vehicle interval acquirer that acquires vehicle interval information between a preceding vehicle that is a preceding one of the vehicles and a succeeding vehicle that is one of the vehicles succeeding the preceding vehicle, based on a time period of a stop of the preceding vehicle at a stop point among the stop points and a distance from the succeeding vehicle to the stop point when the preceding vehicle is stopping at the stop point, and based on a time period of a stop of the succeeding vehicle at a stop point among the stop points, a standard time period of a stop preset for the stop point, and a distance from the stop point to the preceding vehicle when the succeeding vehicle is stopping at the stop point.

Information indicating the number of users who are on board each vehicle may be outputted to be displayed on the information terminal owned by each user of the vehicles. The information indicating the number of users who are on board each vehicle does not need to be the number of users itself. For example, the information may be information indicating a degree of congestion in each vehicle expressed by using a plurality of levels.

The disclosure relates to a vehicle. The vehicle includes a transmitter that transmits current position information to an operation control apparatus for a plurality of vehicles traveling in a self-driving manner on a cyclic route having a plurality of stop points, the operation control apparatus including a vehicle interval acquirer that acquires vehicle interval information between a preceding vehicle that is a preceding one of the vehicles and a succeeding vehicle that is one of the vehicles succeeding the preceding vehicle, based on a time period of a stop of the preceding vehicle at a stop point among the stop points and a distance from the succeeding vehicle to the stop point when the preceding vehicle is stopping at the stop point, and based on a time period of a stop of the succeeding vehicle at a stop point among the stop points, a standard time period of a stop preset for the stop point, and a distance from the stop point to the preceding vehicle when the succeeding vehicle is stopping at the stop point; and a receiver that receives, from the operation control apparatus, future time information acquired based on the vehicle interval information, and position information indicating a target position at a time indicated by the time information. The vehicle may further include a controller that generates a control instruction for movement based on the time information and the position information.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a functional block diagram of an automatically operated vehicle and a schematic diagram of an operation system including the automatically operated vehicle and the like;

FIG. 4 shows an example of control information acquired by a control apparatus and transmitted to each of the automatically operated vehicle and the like.

DETAILED DESCRIPTION OF EMBODIMENTS

Hereinafter, embodiments of the disclosure will be described with reference to the drawings. The embodiments are provided for illustrative purposes to describe the disclosure, and it is not intended to limit the disclosure to the embodiments.

Figure 1:
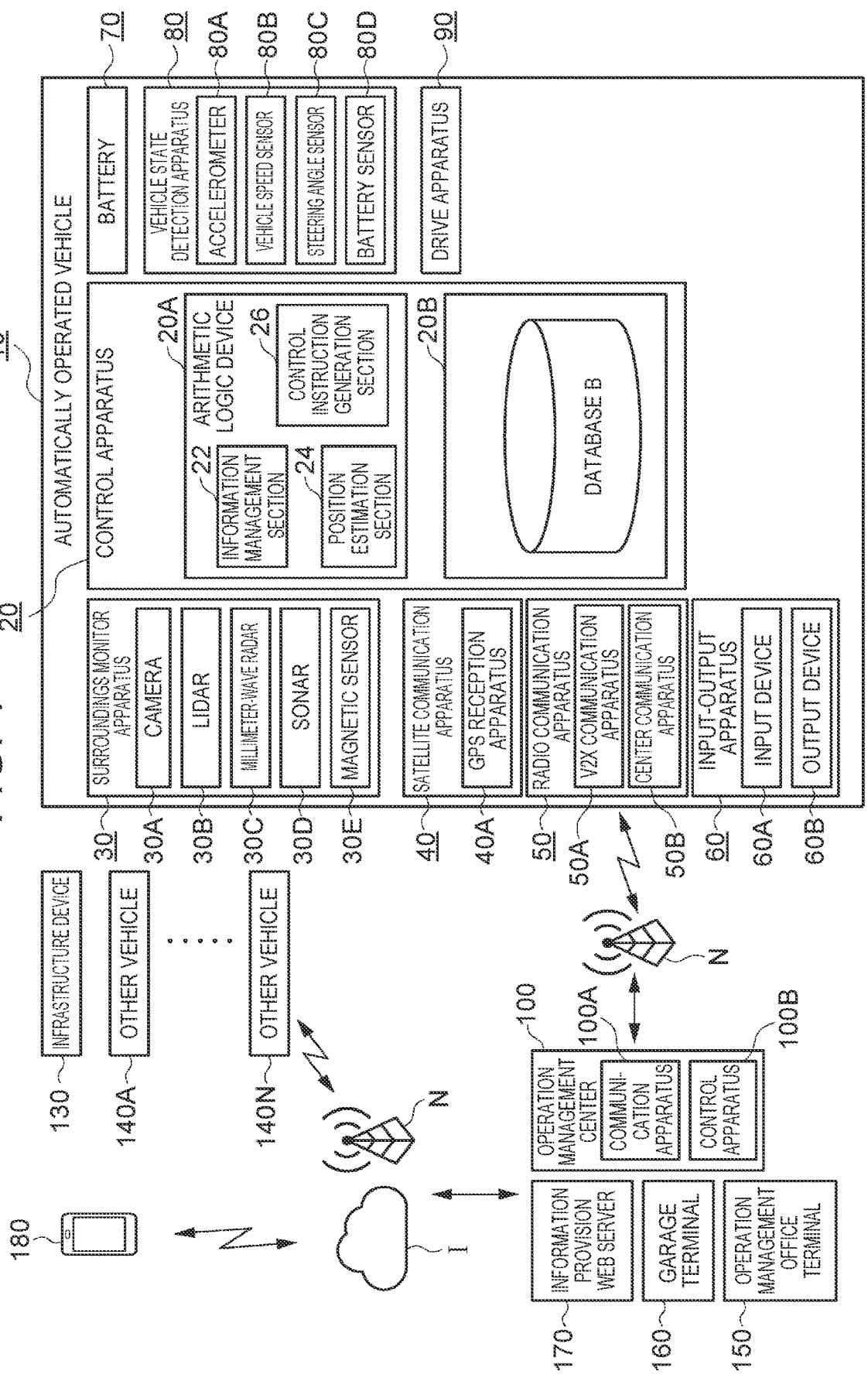

FIG. 1 shows a functional block diagram of an automatically operated vehicle 10. The automatically operated vehicle 10 illustrated in the embodiment is, for example, a large-sized vehicle with a passenger capacity of 30 people. The automatically operated vehicle 10 is an automatically operated vehicle configured to be able to autonomously travel based on control information and the like received from an operation management center 100. However, crew to deal with an emergency and support passengers may be on board the automatically operated vehicle 10.

The automatically operated vehicle 10 includes a control apparatus 20 for automatic operation, a surroundings monitor apparatus 30, a satellite communication apparatus 40, a radio communication apparatus 50, an input-output apparatus 60, a battery 70, a vehicle state detection apparatus 80, and a drive apparatus 90.

The control apparatus 20 is connected to each apparatus of the automatically operated vehicle 10, including the surroundings monitor apparatus 30 to the drive apparatus 90, through an internal bus and the like (not shown) and controls the individual apparatuses. The control apparatus 20 receives a predetermined signal from each apparatus through the internal bus and, based on the received signal, generates and outputs a control instruction for driving each apparatus. The control apparatus 20 includes an arithmetic logic device 20A and a storage device 20B. A computer program stored in the storage device 20B is executed by the arithmetic logic device 20A, whereby various arithmetic logic operation processing performed by the automatically operated vehicle 10 in the disclosure is executed.

The arithmetic logic device 20A executes predetermined arithmetic logic operation processing in accordance with the computer program such as firmware stored in the storage device 20B. The arithmetic logic device 20A can be configured by using one or more of a central processing unit (CPU), an MPU (Micro Processing Unit), a GPU, a microprocessor, a processor core, a multiprocessor, an ASIC (Application-Specific Integrated Circuit), an FPGA (Field Programmable Gate Array), and the like.

The storage device 20B includes a nonvolatile memory, such as an MRAM, a NAND flash memory, or a NOR flash memory, or an SSD or a hard disk drive, and a volatile memory such as an SRAM or a DRAM. The nonvolatile memory includes the computer program for executing the various arithmetic logic operation processing as illustrated in the flowchart and others in the disclosure, map information including a dynamic map (highly precise map information dynamically generated as digital map information in which static base map information indicating road alignments and the like is integrated with dynamic environmental information about real-time dynamic road-surface states of roads, places of accidents, positions of vehicles, positions of pedestrians, and the like), and a database D in which other various data required in the disclosure are stored. The nonvolatile memory corresponds to a non-transient tangible medium. The volatile memory provides a work area in which the computer program loaded from the nonvolatile memory and various data generated while the arithmetic logic device 20A executes the computer program are temporarily stored. Note that the nonvolatile memory may store the computer program and data that are externally received by the radio communication apparatus 50.

The control apparatus 20 functionally includes an information management section 22, a position estimation section 24, and a control instruction generation section 26. The information management section 22 collects information required for automatic operation from the surroundings monitor apparatus 30, the satellite communication apparatus 40, the radio communication apparatus 50, the vehicle state detection apparatus 80, and the like and provides the information to the position estimation section 24 and the control instruction generation section 26.

The position estimation section 24 periodically acquires an absolute position of the automatically operated vehicle 10, as absolute coordinates of longitude and latitude, based on the dynamic map stored in the storage device 20B and estimated position information collected by the information management section 22, and also acquires relative coordinates of the automatically operated vehicle 10 relative to an object around the automatically operated vehicle 10. The control apparatus 20 transmits the absolute position information and the relative position information acquired by the position estimation section 24 to the operation management center 100 by using the radio communication apparatus 50.

The control instruction generation section 26 generates a control instruction for driving the automatically operated vehicle 10 in accordance with the dynamic map stored in the storage device 20B, the position information on the automatically operated vehicle 10 acquired from the position estimation section 24, traveling state information on the automatically operated vehicle 10 collected by the information management section 22, and the control information received from the operation management center 100, and outputs the control instruction to the drive apparatus 90. The control instruction generation section 26 periodically acquires a current position of the automatically operated vehicle 10 from the position estimation section 24, generates a control instruction such that the position of the automatically operated vehicle 10 follows the control information received from the operation management center 100 as closely as possible, and provides the control instruction to the drive apparatus 90. However, the control instruction generation section 26 may recognize an obstacle and the like based on surroundings of the automatically operated vehicle 10 detected by the surroundings monitor apparatus 30 and, regardless of the control information received from the operation management center 100, may generate and provide to the drive apparatus 90 a control instruction for decelerating, stopping, steering, or the like of the automatically operated vehicle 10 in order to avoid contact with the obstacle. The control information provided from the operation management center 100 will be described in detail later. Note that the automatically operated vehicle 10 is configured to stop an automatic mode based on an operation by the crew on the input-output apparatus 60 and to be able to travel based on operations by the crew on a wheel, an accelerator pedal, a brake pedal, and the like. In such a case, the control apparatus 20 generates a control instruction for driving the automatically operated vehicle 10 based on the operations by the crew on the wheel and the like and provides the control instruction to the drive apparatus 90.

The surroundings monitor apparatus 30 includes sensors such as a camera 30A, a LIDAR (Laser Detection and Ranging) 30B, a millimeter-wave radar 30C, a sonar 30D, and a magnetic sensor 30E. The surroundings monitor apparatus 30, by using the sensors, detects a surrounding environment, including an object such as a vehicle, a person, or an obstacle around the automatically operated vehicle 10, a distance and a direction to the object, and a white line, a road-surface state, and the like of a road or the like on which the automatically operated vehicle 10 is traveling, and provides the surrounding environment to the control apparatus 20.

The satellite communication apparatus 40 includes a GPS reception apparatus 40A. The GPS reception apparatus 40A receives a positioning signal from a GPS satellite 110 and provides the positioning signal, as position information on the automatically operated vehicle 10, to the control apparatus 20. The position estimation section 24 of the control apparatus 20 acquires the current position of the automatically operated vehicle 10 based on the received positioning signal. Apart from acquisition of the current position by using the GPS technology, the current position may be estimated from, for example, an article, a sight, a sign, a marker, or the like in the surroundings.

The radio communication apparatus 50 includes a V2X (Vehicle-to-X) communication apparatus 50A and a center communication apparatus 50B. Specifically, the V2X communication apparatus 50A includes a communication apparatus that is compliant with communication standards such as 802.11ac established by IEEE for V2N (Vehicle-to-cellular Network) communication, V2V (Vehicle-to-Vehicle) communication, V2I (Vehicle-to-road side Infrastructure) communication, and V2P (Vehicle-to-Pedestrian) communication. The center communication apparatus 50B includes a communication apparatus for communicating with the operation management center 100. Accordingly, the automatically operated vehicle 10 can perform high-speed communication with each of a plurality of infrastructure devices 130 installed on traffic signals or buried under roads, a plurality of other vehicles 140, and the operation management center 100.

The input-output apparatus 60 includes an input device 60A and an output device 60B. The input device 60A is a device for allowing the crew or a passenger to input information. The input device 60A includes a microphone for receiving a speech input from the crew and passengers and speech recognition processing software supporting a plurality of languages. The crew can input an instruction for controlling the automatically operated vehicle 10 via the microphone. A passenger can input or search for a bus stop where the passenger intends to alight via the microphone. The input device 60A includes an IC card unit for identifying the crew and passengers. The crew and the like can cause the IC card unit to identify a fact that the crew and the like are on board the automatically operated vehicle 10 by placing respective ICs held by the crew and the like over the IC card unit. The input device 60A further includes a touch panel and a mechanical switch, and the crew and passengers can also input information by using the touch panel and the mechanical switch. For example, the crew can operate a door of the automatically operated vehicle 10 stopping at a bus stop to open and close by using the mechanical switch.

The output device 60B includes a display for outputting image information and a speaker for outputting audio information. The image information shows a cyclic route along which the automatically operated vehicle 10 is scheduled to travel, the current position of the automatically operated vehicle 10, and the like.

The battery 70 is a secondary battery such as a lithium ion battery or a nickel-metal hydride battery and provides a power source for various actuators mounted in the drive apparatus 90.

The vehicle state detection apparatus 80 includes an accelerometer 80A, a vehicle speed sensor 80B, a steering angle sensor 80C, a battery sensor 80D, and the like. The battery sensor 80D is configured to detect a remaining capacity of the battery 70 and provides the detected remaining capacity to the control apparatus 20. The control apparatus 20 can transmit battery remaining capacity information to the operation management center 100 by using the radio communication apparatus 50. The vehicle state detection apparatus 80 detects a traveling state of the automatically operated vehicle 10 by using the sensors and provides the detected traveling state to the control apparatus 20.

The drive apparatus 90 includes a motor and other actuators for operating an engine, a brake, and the wheel of the automatically operated vehicle 10, and operates based on the control instruction received from the control apparatus 20. As mentioned above, the automatically operated vehicle 10 is configured to be able to stop automatic operation and output the control instruction, which is generated by the control apparatus 20 based on operations by the crew or the like on the accelerator pedal, the brake pedal, the wheel, and the like, to the drive apparatus 90 and the like.

The operation management center 100 is a control apparatus that controls the automatically operated vehicle 10 and the plurality of other vehicles 140 that are other automatically operated vehicles and have the same configurations as the configuration of the automatically operated vehicle 10. Note that when an individual one of the other vehicles is mentioned, the other vehicles are referred to as the other vehicle 140A, the other vehicle 140N, and the like, and when the other vehicles are collectively mentioned, the other vehicles are referred to as the other vehicles 140. Moreover, the automatically operated vehicle 10 and the other vehicles 140 are collectively referred to as the automatically operated vehicle 10 and the like. A description of each component of the other vehicles 140 will be omitted by using the same numerals that are used for the corresponding components of the automatically operated vehicle 10.

The operation management center 100 receives information indicating the current position, the number of passengers, and the remaining capacity of the battery from each of the automatically operated vehicle 10 and the like along with information for identifying the vehicle and, based on the information, acquires vehicle interval information indicating vehicle intervals between each pair of the automatically operated vehicle 10 and the like, which will be described in detail later. Based on the acquired each vehicle interval information, the operation management center 100 acquires, for each of the automatically operated vehicle 10 and the like, position information indicating a target position where the vehicle is desired to be present at a predetermined future time and time information indicating the predetermined future time through calculation or the like, and transmits the position information and the time information to each of the automatically operated vehicle 10 and the like.

The operation management center 100 issues a let-out order to leave the cyclic route and head for a garage to any vehicle of the automatically operated vehicle 10 and the like that is low on the remaining capacity of the battery 70 and, conversely, issues an instruction to a vehicle on standby in the garage to bring the vehicle on the cyclic route.

The operation management center 100 includes a communication apparatus 100A and a control apparatus 100B. A hardware configuration of the control apparatus 100B is similar to the hardware configuration of the control apparatus 20, and includes an arithmetic logic device and a storage device. In the storage device, a computer program, a dynamic map, and position information on each vehicle associated with identification information on the vehicle are stored. The arithmetic logic device executes each arithmetic logic operation processing described in the disclosure by executing the computer program stored in the storage device.

The operation management center 100 can communicate with the automatically operated vehicle 10, the plurality of other vehicles 140, and the plurality of infrastructure devices 130 through a telecommunication carrier base station N by using the communication apparatus 100A. For example, the operation management center 100 and the telecommunication carrier base station N are connected through a wired link, and the telecommunication carrier base station N and the automatically operated vehicle 10 or the other vehicles 140 are connected through a wireless link.

Moreover, the operation management center 100, by using the communication apparatus 100A, is connected to an operation management office terminal 150, a garage terminal 160, and an information provision web server 170 through, for example, a wired LAN. The operation management office terminal 150 and the garage terminal 160 therefore can access each information, such as the current position, on each of the automatically operated vehicle 10 and the other vehicles 140 acquired by the operation management center 100. Accordingly, respective operators of the operation management office terminal 150 and the garage terminal 160 can grasp an operation state at any time and issue a control instruction for controlling each vehicle as needed. For example, in case of emergency, the operator of the operation management office terminal 150 can issue a control instruction for bringing each of the automatically operated vehicle 10 and the like to an emergency stop.

The information provision web server 170 also can acquire the information, such as the current position, on each of the automatically operated vehicle 10 and the like acquired by the operation management center 100 from the operation management center 100. Accordingly, a passenger or a prospective passenger of the automatically operated vehicle 10 and the like can access the information provision web server 170 through the Internet I by using an information processing terminal 180 owned by the passenger or the prospective passenger, and acquire and display on the information processing terminal 180 the current position of each of the automatically operated vehicle 10 and the like, the cyclic route R, and stop points S. When a predetermined stop point S displayed on a display of the information processing terminal 180 is selected by the prospective passenger or the like, the operation management center 100 provides time period information on a time period required for any vehicle of the automatically operated vehicle 10 and the like to arrive at the stop point S and causes the time period information to be displayed on the display of the information processing terminal 180. When a vehicle of the automatically operated vehicle 10 and the like displayed on the display of the information processing terminal 180 is selected, the operation management center 100 provides a congestion state in the selected vehicle and time period information on a time period required for the selected vehicle to arrive at a predetermined stop point S and causes the congestion state and the time information to be displayed on the display of the information processing terminal 180.

Figure 2:
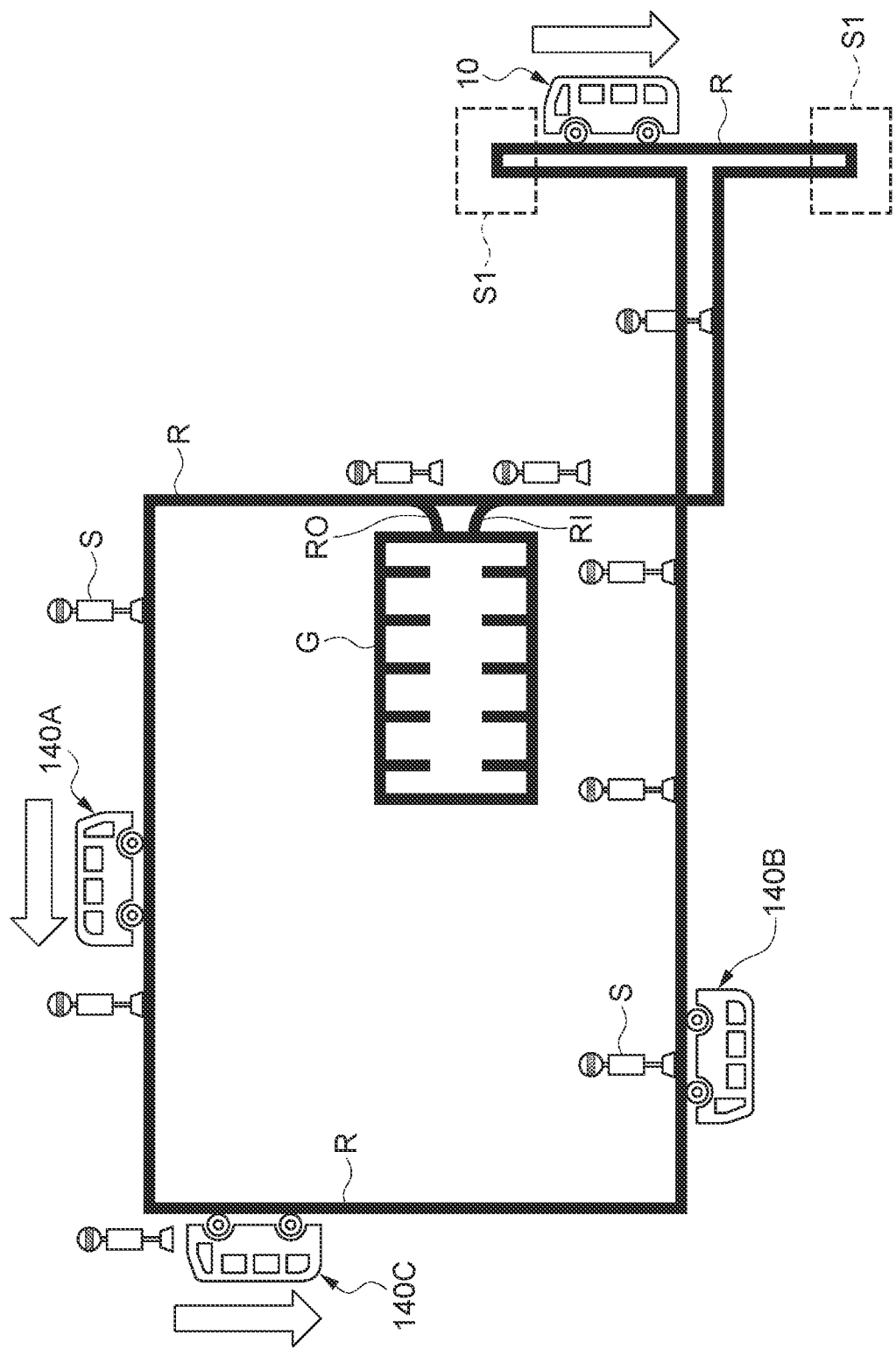
FIG. 2 is a schematic diagram showing that the automatically operated vehicle and other vehicles controlled by an operation management center are traveling on a cyclic route.

FIG. 2 is a schematic diagram showing that the automatically operated vehicle 10 and the like controlled by the operation management center 100 are traveling on the cyclic route R. As shown in FIG. 2, the cyclic route R is a cyclic route that allows a vehicle traveling along the route to come back to an original place. The automatically operated vehicle 10 and the plurality of other vehicles 140 travel along the cyclic route R. For example, one lap of the cyclic route R is three kilometers, and a maximum of 15 vehicles of the automatically operated vehicle 10 and the like can travel on the cyclic route R at the same time. The stop points S at which the automatically operated vehicle 10 and the plurality of other vehicles 140 stop for a predetermined time period to allow occupants to board and alight are provided along the cyclic route R. FIG. 2 shows that the other vehicle 140B stops at one of the stop points S. However, intervals between pairs of the stop points S are not necessarily constant. Standard time periods of a stop set for the individual stop points S are not necessarily constant. For example, a relatively long standard time period of a stop is preset for a stop point S where a large number of occupants are expected to board and alight, compared to the standard time periods of a stop set for the other stop points S.

A garage G is provided at a location off the cyclic route R. A charge station is installed in the garage G; and the automatically operated vehicle 10 and the like can charge the respective batteries 70 while on standby in the garage G A route RO connecting the garage G to the cyclic route R is a route traveled when the automatically operated vehicle 10 and the like on standby in garage G are brought on the cyclic route R. A route RI connecting the garage G to the cyclic route R is a route traveled when the automatically operated vehicle 10 and the like traveling on the cyclic route R are let out and move into the garage G Accordingly, the outgoing route RO from garage G is connected to the cyclic route R at a point after the incoming route RI to the garage G, in a traveling direction of the automatically operated vehicle 10 and the like indicated by arrows in FIG. 2.

Figure 3:
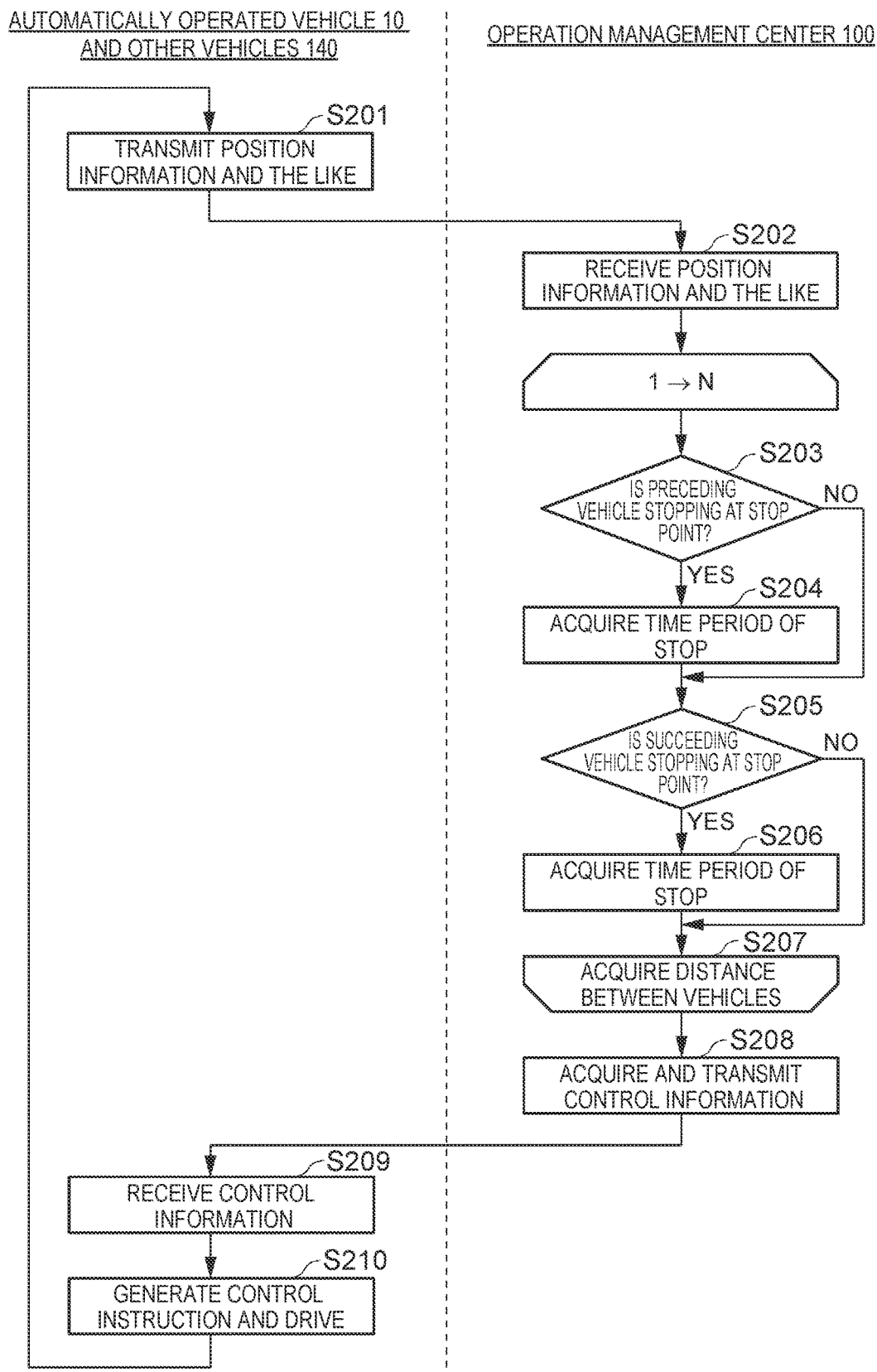
FIG. 3 is a flowchart showing a method of acquiring vehicle interval information according to an embodiment.

FIG. 3 is a flowchart showing a method of acquiring the vehicle interval information according to the embodiment. The arithmetic logic device of the control apparatus 100B of the operation management center 100 periodically executes the flowchart shown in FIG. 3 in accordance with the computer program recorded in the storage device, acquires vehicle interval information indicating vehicle intervals between each pair of the automatically operated vehicle 10 and the like traveling on the cyclic route R, acquires control information for controlling each of the automatically operated vehicle 10 and the like based on the vehicle interval information, and transmits the control information to each of the automatically operated vehicle 10 and the like.

Each of the automatically operated vehicle 10 and the like transmits current absolute position information and current relative position information on the vehicle 10 and the like acquired by the position estimation section 24 based on position information and the like received from the GPS reception apparatus 40A, information indicating the remaining capacity of the battery 70, and information indicating the number of passengers to the operation management center 100 along with the identification information on the vehicle (step S201).

When the position information and the like are received from the automatically operated vehicle 10 and the like (step S202), the control apparatus 100B of the operation management center 100 stores the received information in the storage device of the control apparatus 100B in association with the automatically operated vehicle 10 and the like, respectively.

The control apparatus 100B of the operation management center 100 repeats each processing in step S203 to step S207 N times equal to the number of the automatically operated vehicle 10 and the like traveling on the cyclic route R, and acquires N pieces of the vehicle interval information.

The control apparatus 100B of the operation management center 100 determines whether or not a vehicle of the automatically operated vehicle 10 and the like preceding a predetermined vehicle of the automatically operated vehicle 10 and the like is stopping at a stop point S (step S203). For a determination method, a plurality of types of methods can be used. For example, when the position information transmitted from a vehicle of the automatically operated vehicle 10 and the like in step S201 is constant, and when a position indicated by the position information corresponds to a stop point S, the control apparatus 100B determines that the vehicle is stopping at the stop point S. Alternatively, the control apparatus 20 of each of the automatically operated vehicle 10 and the like may be configured to transmit, by using the center communication apparatus 50B, to the operation management center 100, a signal indicating that a boarding door is opened when the control apparatus 20 activates an actuator for opening and closing the boarding door included in the drive apparatus 90 of each of the automatically operated vehicle 10 and the like and detects that the boarding door is opened. At the time, when a position indicated by the position information on a vehicle of the automatically operated vehicle 10 and the like corresponds to a stop point S, the control apparatus 100B determines that the vehicle is stopping at the stop point S. Moreover, an infrastructure device 130 incorporating a sensor for detecting that a vehicle of the automatically operated vehicle 10 and the like is stopping may be installed on each stop point S, and the control apparatus 100B can determine that a vehicle of the automatically operated vehicle 10 and the like is stopping at a stop point S, based on a detection signal from the infrastructure device 130.

When it is determined that the vehicle of the automatically operated vehicle 10 and the like preceding the predetermined vehicle of the automatically operated vehicle 10 and the like is stopping at a stop point S, the control apparatus 100B of the operation management center 100 acquires a time period of a stop for which the preceding vehicle of the automatically operated vehicle 10 and the like stops (step S204). For example, the time period of a stop can be acquired by acquiring a count value of a counter that starts counting when it is determined in step S203 that the vehicle of the automatically operated vehicle 10 and the like preceding the predetermined vehicle of the automatically operated vehicle 10 and the like is stopping at a stop point S.

The time period of a stop is not acquired when it is not determined that the vehicle of the automatically operated vehicle 10 and the like preceding the predetermined vehicle of the automatically operated vehicle 10 and the like is stopping at a stop point S.

The control apparatus 100B of the operation management center 100 similarly determines whether or not the vehicle of the automatically operated vehicle 10 and the like succeeding the preceding vehicle of the automatically operated vehicle 10 and the like is stopping at a stop point S (step S205) and, when it is determined that the succeeding vehicle is stopping at a stop point S, acquires a time period of a stop (step S206).

The control apparatus 100B of the operation management center 100 acquires vehicle interval information indicating a vehicle interval between the preceding vehicle of the automatically operated vehicle 10 and the like and the succeeding vehicle of the automatically operated vehicle 10 and the like (step S207).

When neither the preceding vehicle nor the succeeding vehicle of the automatically operated vehicle 10 and the like is stopping at a stop point S, the vehicle interval information is calculated based on a following expression.

$$L/V[S] \qquad \text{Expression 1:}$$

Here, L is a distance on the cyclic route R between the preceding vehicle of the automatically operated vehicle 10 and the like and the succeeding vehicle of the automatically operated vehicle 10 and the like. The control apparatus 100B of the operation management center 100 can acquire L based on the position information acquired in step S201 from the preceding vehicle of the automatically operated vehicle 10 and the like and the position information acquired in step S201 from the succeeding vehicle of the automatically operated vehicle 10 and the like.

Moreover, V is a standard speed. The standard speed is an ordinary speed assumed when the automatically operated vehicle 10 and the like travel on the cyclic route R at ordinary times. The standard speed is speed information that is preset and recorded in the storage device of the control apparatus 100B. For example, the standard speed is 15 kilometers per hour.

Accordingly, the vehicle interval information is acquired as a time period, expressed in seconds, required for the succeeding vehicle of the automatically operated vehicle 10 and the like to arrive at a position of the preceding vehicle of the automatically operated vehicle 10 and the like.

When only the preceding vehicle of the automatically operated vehicle 10 and the like is stopping at a stop point S and the succeeding vehicle of the automatically operated vehicle 10 and the like is traveling on the cyclic route R, the vehicle interval information is calculated based on a following expression.

$$L/V+Te+Tdec[S] \qquad \text{Expression 2:}$$

Here, L is the distance on the cyclic route R between the preceding vehicle of the automatically operated vehicle 10 and the like and the succeeding vehicle of the automatically operated vehicle 10 and the like, and is equal to a distance between the succeeding vehicle of the automatically operated vehicle 10 and the like and the stop point S because the preceding vehicle of the automatically operated vehicle 10 and the like is stopping at the stop point S. V is the standard speed.

Te is the time period of a stop acquired in step S204, which is referred to as an actual stop-point stopping time period. Tdec is referred to as a stop-point deceleration adjustment time period. The stop-point deceleration adjustment time period is a time loss caused as a result of the automatically operated vehicle 10 and the like decelerating from the standard speed in order to stop at a stop point S. In other words, a difference in time between a time period after the automatically operated vehicle 10 and the like traveling at the standard speed start decelerating and before the automatically operated vehicle 10 and the like stop at a stop point S and a time period required when it is assumed that the automatically operated vehicle 10 and the like travel while maintaining the standard speed until the automatically operated vehicle 10 and the like arrive at the stop point S corresponds to the stop-point deceleration adjustment time period. Tdec is time period information that is preset and recorded in the storage device of the control apparatus 100B. For Tdec, different values may be set for different stop points S. For example, different values of Tdec can be set, taking into consideration a gradient around each stop point S.

When only the succeeding vehicle of the automatically operated vehicle 10 and the like is stopping at a stop point S and the preceding vehicle of the automatically operated vehicle 10 and the like is traveling on the cyclic route R, the vehicle interval information is calculated based on a following expression.

$$L/V+Tbs-Te+Tacc[S] \qquad \text{Expression 3:}$$

Here, L, V, Te are the values described above.

Tbs is referred to as a standard stop-point stopping time period. The standard stop-point stopping time period is a time period of a stop assumed when the automatically operated vehicle 10 and the like stop at ordinary times. The standard stop-point stopping time period is time period information that is preset for each stop point S and recorded in the storage device of the control apparatus 100B. For example, the standard stop-point stopping time period for a stop point S where a large number of passengers are expected to board and alight is 180 seconds. The standard stop-point stopping time period for a stop point S where a small number of passengers are expected to board and alight is 30 seconds.

Tacc is referred to as a stop-point acceleration adjustment time period. The stop-point acceleration adjustment time period is a time loss caused as a result of the automatically operated vehicle 10 and the like accelerating to depart from a stop point S and reach the standard speed. In other words, a difference in time between a time period after the automatically operated vehicle 10 and the like departing from a stop point S start accelerating and before the standard speed is reached and a time period required when it is assumed that the automatically operated vehicle 10 and the like travel at the standard speed from the stop point S to a position where the standard speed is reached corresponds to the stop-point acceleration adjustment time period. Tacc is time period information that is present and recorded in the storage device of the control apparatus 100B. For Tacc, different values may be set for different stop points S. For example, different values of Tacc can be set, taking into consideration a gradient around each stop point S.

For example, with respect to any vehicle of the automatically operated vehicle 10 and the like that is stopping at a stop point S for which Tbs is set at 120 seconds, when the actual stop-point stopping time period Te is 30 seconds, a time period obtained by adding 90 seconds, which is a difference between the standard stop-point stopping time period of 120 seconds and the actual stop-point stopping time period of 30 seconds, to L/V plus the stop-point acceleration adjustment time period is acquired as the vehicle interval information.

Note that both the preceding vehicle and the succeeding vehicle of the automatically operated vehicle 10 and the like are stopping at different stop points S, the vehicle interval information is calculated according to the description given above. Specifically, a sum of (Tbs−Te+Tacc), which is with respect to the succeeding vehicle of the automatically operated vehicle 10 and the like, (Te+Tdec), which is with respect to the preceding vehicle of the automatically operated vehicle 10 and the like, and L/V is acquired as the vehicle interval information by the control apparatus 100B. Here, note that the actual stop-point stopping time period Te of the succeeding vehicle of the automatically operated vehicle 10 and the like and the actual stop-point stopping time period Te of the preceding vehicle of the automatically operated vehicle 10 and the like have different values.

When a stop point S exists between the preceding vehicle of the automatically operated vehicle 10 and the like and the succeeding vehicle of the automatically operated vehicle 10 and the like, the vehicle interval information is acquired according to the description given above. Specifically, a sum of Tbs set for the stop point S, Tdcc, Tacc, and L/V is acquired as the vehicle interval information by the control apparatus 100B.

According to the operation management center 100 as described above, it is possible to acquire, with high accuracy, information indicating vehicle operation intervals between each pair of a plurality of vehicles traveling in a self-driving manner on a cyclic route having a plurality of stop points. For example, when only a preceding vehicle of the automatically operated vehicle 10 and the like is stopping at a stop point S, it is possible to acquire information indicating a vehicle interval that varies depending on the actual stop-point stopping time period of the preceding vehicle of the automatically operated vehicle 10 and the like. Accordingly, the operation management center 100 can perform different control between when the actual stop-point stopping time period of the preceding vehicle of the automatically operated vehicle 10 and the like is short and the preceding vehicle is expected to stop at the stop point S for a while, and when the actual stop-point stopping time period of the preceding vehicle of the automatically operated vehicle 10 and the like is long and the preceding vehicle is expected to depart from the stop point S soon.

When only a succeeding vehicle of the automatically operated vehicle 10 and the like is stopping at a stop point S, since it is possible to acquire information indicating a vehicle interval that varies depending on the actual stop-point stopping time period of the succeeding vehicle of the automatically operated vehicle 10 and the like, similarly, the operation management center 100 can perform different control.

The control apparatus 100B of the operation management center 100 executes the processing in step S203 to step S207 for all N vehicles traveling on the cyclic route R and acquires N pieces of the vehicle interval information.

The control apparatus 100B of the operation management center 100 acquires control information for controlling each of the automatically operated vehicle 10 and the like based on the N pieces of the vehicle interval information and transmits the control information to each of the automatically operated vehicle 10 and the like (step S208).

The control apparatus 100B of the operation management center 100 acquires the control information by comparing Ts, which is a standard vehicle time interval preset and recorded in the storage device, with the N pieces of the vehicle interval information. The standard vehicle time interval is calculated based on a following equation.

$$Ts = \left( Lt/V + \sum_{i=1}^{Nbs} (Tbs(i) + Tdec(i) + Tacc(i)) \right) / N[S] \quad \text{Expression 4}$$

Here, Lt is a distance of a lap of the cyclic route R. N is the number of the automatically operated vehicle 10 and the like that are traveling on the cyclic route R. Nbs is the number of the stop points S set along the cyclic route R. The other values are as described above. Accordingly, the standard vehicle time interval Ts is time period information obtained by dividing a value obtained by adding a sum of sums of the stop-point acceleration adjustment time period Tacc, the standard stop-point stopping time periods Tbs, and the stop-point deceleration adjustment time periods Tdec for the individual stop points S to a quotient of the distance of a lap of the cyclic route R divided by the standard speed V, by N, which is the number of the automatically operated vehicle 10 and the like that are traveling on the cyclic route R.

The control apparatus 100B of the operation management center 100 compares a time period indicated by the vehicle interval information with Ts, acquires such control information that makes the vehicle interval longer when the time period indicated by the vehicle interval information is larger than Ts or acquires such control information that makes the vehicle interval shorter when the time period indicated by the vehicle interval information is smaller than Ts, and transmits the control information to each of the automatically operated vehicle 10 and the like.

FIG. 4 illustrates the control information acquired by the control apparatus 100B and transmitted to each of the automatically operated vehicle 10 and the like. In FIG. 4, time t0 represents a current time. Time t1 and subsequent times represent future times. For example, time t1 represents a time one second after time t0 representing the current time. Similarly, time t2 represents a time two seconds after time t0 representing the current time. (XA0, YA0) shown in a cell on an "other vehicle 140A" row under time t0 is information indicating a longitude and a latitude of the current position of the other vehicle 140A at current time t0. (XA1, YA1) shown in a cell on the "other vehicle 140A" row under time t1 is information indicating a longitude and a latitude of a target position of the other vehicle 140A on the cyclic route R at future time t1.

The control apparatus 100B of the operation management center 100 acquires, for each of the automatically operated vehicle 10 and the like traveling on the cyclic route R, information indicating a target position of the vehicle on the cyclic route R at each of future time t1 to, for example, future time t10 that is ten seconds later, as described above. Here, the target positions are determined such that each vehicle interval information becomes closer to the standard vehicle time interval Ts.

For example, the control apparatus 100B sets a target position for each of the automatically operated vehicle 10 and the like such that the vehicle interval information between each vehicle pair is close to the standard vehicle time interval Ts at future time t10, and can set target positions at future time t1 to future time t9 based on the target position at future time t10.

For example, when a vehicle interval between the other vehicle 140A and the preceding automatically operated vehicle 10 is larger than the standard vehicle time interval Ts, and when a vehicle interval between the other vehicle 140A and the succeeding other vehicle 140C is smaller than the standard vehicle time interval, the target position of the other vehicle 140A at future time t10 is set relatively far from the current position of the other vehicle 140A on the cyclic route R, and the target position of the other vehicle 140C is set relatively close to the current position of the other vehicle 140C on the cyclic route R in some cases. Similarly, the target position of the automatically operated vehicle 10 is set relatively close to the current position of the automatically operated vehicle 10 in some cases.

Even when there is a longer distance on the route between the other vehicle 140B and the preceding other vehicle 140C and there is a shorter distance on the route between the other vehicle 140C and the preceding other vehicle 140A, it is determined that the vehicle interval information is smaller than the standard vehicle time interval Ts when no stop point S exists between the other vehicle 140B and the preceding other vehicle 140C, but when one or more stop points S exist between the other vehicle 140B and the preceding other vehicle 140C, it is determined that the vehicle interval information is larger than the standard vehicle time interval Ts, and the control apparatus 100B acquires such control information that causes the other vehicle 140C to accelerate, that is, makes the distance on the route between the other vehicle 140B and the preceding other vehicle 140C further longer and makes the distance on the route between the other vehicle 140C and the preceding other vehicle 140A further shorter in some cases.

When each of the automatically operated vehicle 10 and the like receives the control information as shown in FIG. 4 from the operation management center 100 by using the center communication apparatus 50B (step S209), the control information is provided to the control apparatus 20. Based on the received control information, the control instruction generation section 26 of the control apparatus 20 generates a control instruction for driving each actuator in the drive apparatus 90 such that the respective target positions on the cyclic route R at future times t1 to t10 indicated by the time information can be reached at the times (step S210). However, the control instruction is not generated such that the target positions can always be reached at the predetermined future times. For example, when a maximum speed of the automatically operated vehicle 10 and the like is limited to 20 kilometers per hour, the control instruction is generated within a range not exceeding the speed limit. The control instruction generation section 26 of the control apparatus 20 generates the control instruction such that the target positions respectively set for the received future times can be reached at the future times as punctually as possible, similarly, under predetermined restrictive conditions such as stops at the stop points S and a sudden stop to avoid a collision with an obstacle. Note that the control apparatus 100B of the operation management center 100 may transmit, in addition to the control information described above, route information including a lane plan for traveling along the cyclic route R as control information to each of the automatically operated vehicle 10 and the like.

Step S201 to step S210 as described above are executed periodically, for example, at intervals of one second. Accordingly, the control information received by each of the automatically operated vehicle 10 and the like is updated at intervals of one second. For example, a two-second-later target position (XA2, YA2) at future time t2 received at a predetermined time may differ from a one-second-later target position (XA1, YA1) at future time t1 received one second after the predetermined time in some cases. However, since the automatically operated vehicle 10 and the like acquire the information indicating ten respective target positions for future ten seconds at a time, the control instruction for smoothly driving the actuators in the drive apparatus 90 can be generated based on such ten target positions. Even when the control information is updated, since the amount of a change is small, it is possible to perform fine-grained control without greatly impairing smooth driving of the actuators.

The position information included in the control information is not taken as target positions to be unfailingly reached at predetermined future times, but is treated as so-called targets to be strived for. Accordingly, it is possible to reduce sudden acceleration and sudden stops and to achieve smooth traveling of the automatically operated vehicle 10 and the like.

According to the operation management center and the automatically operated vehicle as described above, it is possible to acquire a vehicle interval taking into consideration stop points such as stations or bus stops. Since a plurality of pieces of vehicle interval information are acquired and a plurality of automatically operated vehicles can be controlled based on such vehicle interval information, for example, it is possible to perform control such that each vehicle interval becomes an equal interval. However, each vehicle interval does not need to be always equal. For example, control may be performed such that a vehicle interval to a predetermined vehicle becomes half the other vehicle intervals. For example, when the number of automatically operated vehicles traveling on a cyclic route is increased or reduced, control may be performed such that one or more vehicle intervals differ from the other vehicle intervals. When a plurality of types of vehicles travel along a single cyclic route, vehicle intervals may be controlled for each type.

Note that a stop point is a point where a vehicle practically makes no advance along the cyclic route. Accordingly, stop points may include a turn point and the like. FIG. 2 shows that stop points S1 that are turn points are provided. The stop points S1 can be treated similarly to the stop points S. A standard stop-point stopping time period for each stop point S1 is a time period required for the automatically operated vehicle 10 and the like to make a turn. When the automatically operated vehicle 10 and the like are making a turn, the automatically operated vehicle 10 and the like only change direction while moving and therefore practically make no advance along the cyclic route R.

The automatically operated vehicle 10 and the like may be configured to stop at all the stop points or to pass through one or some of the stop points. For example, a configuration may be made such that a stop-passage determination point is provided before each stop point, and when the automatically operated vehicle 10 and the like pass the stop-passage determination point, the automatically operated vehicle 10 and the like request the operation management center 100 to determine a stop or passage, and the operation management center 100 instructs the automatically operated vehicle 10 and the like to stop or pass through.

The automatically operated vehicle 10 and the like may be configured to travel without using the control information from the operation management center 100 at the stop points. For example, the automatically operated vehicle 10 and the like may be configured to, after passing a point provided before each stop point, disable the time information and the position information received from the operation management center 100 and autonomously travel in accordance with information acquired by the surroundings monitor apparatus 30 and the vehicle state detection apparatus 80 and a stop-point stopping sequence program recorded in the storage device 20B. With such a configuration, it is possible to perform, around the stop points S, traveling that is not based on the vehicle interval information and the like but achieves acceleration and deceleration taking ride comfort and the like into consideration, in accordance with a predetermined sequence. It is also possible to restrain actual values from greatly differing from Tdec and Tacc. After the automatically operated vehicle 10 and the like pass a point provided immediately after each stop point, the automatically operated vehicle 10 and the like cancel the disablement of the time information and the position information received from the operation management center 100 and thus can resume being controlled based on the time information and the position information.

Modification Examples

The embodiment relates to an aspect in which time-basis information is acquired as the vehicle interval information. Accordingly, the time-basis information is acquired by multiplying L, which indicates a distance on the cyclic route R between a preceding vehicle of the automatically operated vehicle 10 and the like and a succeeding vehicle of the automatically operated vehicle 10 and the like, by the standard speed V. Through such processing, it is possible to easily acquire the vehicle interval information that is based on both distance-basis information and time-basis information such as Te, which is an actual stop-point stopping time period of each of the automatically operated vehicle 10 and the like stopping at a stop point S.

However, the vehicle interval information may be acquired by converting time-basis information such as Te, which is an actual stop-point stopping time period of each of the automatically operated vehicle 10 and the like stopping at a stop point S, into distance-basis information. Time-basis information may be converted into information in another unit. Information may be treated as the information in different units without being converted, by making a correction using a predetermined coefficient or the like.

For example, the vehicle interval information can be acquired by setting a virtual route having a distance obtained by multiplying the standard stop-point stopping time period Tbs by the standard speed V for each stop point S, and assuming, during a stop, that the automatically operated vehicle 10 and the like continue traveling at the standard speed on the virtual route.

When only a preceding vehicle of the automatically operated vehicle 10 and the like is stopping at a stop point S and a succeeding vehicle of the automatically operated vehicle 10 and the like is traveling on the cyclic route R, the vehicle interval information is calculated based on a following expression.

$$L + V \times Te \quad \text{Expression 5:}$$

When only a succeeding vehicle of the automatically operated vehicle 10 and the like is stopping at a stop point S and a preceding vehicle of the automatically operated vehicle 10 and the like is traveling on the cyclic route R, the vehicle interval information is calculated based on a following expression.

$$L + V \times (Tbs - Te) \quad \text{Expression 6:}$$

Based on the expressions, any vehicle of the automatically operated vehicle 10 and the like stopping at a stop point S can be treated as if the vehicle is traveling on the virtual route. A distance advanced on the virtual route is proportional to the actual stop-point stopping time period Te and is a value obtained by multiplying the actual stop-point stopping time period Te by the standard speed V. Note that a time loss accompanying acceleration and deceleration may further be taken into consideration by adding values obtained by multiplying Tacc and Tdec each by the standard speed V. When an impact is minor or the like, Tdec and Tacc do not need to be set, depending on circumstances.

The operation management center 100 or the information provision web server 170 may be configured to allow information indicating positions of the automatically operated vehicle 10 and the like on the virtual routes based on the virtual routes and the actual stop-point stopping time periods as described above to be displayed, in a manner of being superposed on the cyclic route R, on the information processing terminal 180 owned by each user. With such display, it is possible to easily understand that each of the automatically operated vehicle 10 and the like will depart from a stop point S soon or stop at the stop point S for a while. Accordingly, a prospective passenger heading for a predetermined stop point S can visually understand how much time the prospective passenger has to board a vehicle of the automatically operated vehicle 10 and the like that is stopping at the stop point S. It can also be visually understood that distances of the virtual routes differ at the different stop points S. Accordingly, even a traveler or the like who does not understand a language can easily understand information indicating that a predetermined vehicle of the automatically operated vehicle 10 and the like will depart from a stop point S soon, stop at the stop point S for a while, or the like.

Various changes can be made to the disclosure, without departing from the scope of the disclosure. For example, one or some of the components in an embodiment can be added to another embodiment, within the scope of an ordinary capacity of creation of those skilled in the art. One or some of the components in an embodiment can be replaced with a corresponding component or components in another embodiment.

What is claimed is:

1. An operation control apparatus for a plurality of vehicles traveling in a self-driving manner on a cyclic route having a plurality of stop points, comprising:

a vehicle interval acquirer that acquires vehicle interval information between a preceding vehicle that is a preceding one of the vehicles and a succeeding vehicle that is one of the vehicles succeeding the preceding vehicle, based on a time period of a stop of the preceding vehicle at a stop point among the stop points and a distance from the succeeding vehicle to the stop point when the preceding vehicle is stopping at the stop point, and based on a time period of a stop of the succeeding vehicle at a stop point among the stop points, a standard time period of a stop preset for the stop point, and a distance from the stop point to the preceding vehicle when the succeeding vehicle is stopping at the stop point; and a controller that controls the plurality of vehicles based on the vehicle interval information.

2. The operation control apparatus according to claim 1, wherein the vehicle interval acquirer acquires the vehicle interval information, further based on a delay time period occurring as a result of the succeeding vehicle decelerating to stop at the stop point when the preceding vehicle is stopping at the stop point, and further based on a delay time period occurring as a result of the preceding vehicle accelerating to depart from the stop point when the succeeding vehicle is stopping at the stop point.

3. The operation control apparatus according to claim 1, wherein the vehicle interval acquirer is configured to be able to acquire at least three pieces of the vehicle interval information when the number of the vehicles traveling on the cyclic route is n (n is an integer not smaller than 4), and the operation control apparatus further comprises a transmitter configured to able to transmit, to each of the plurality of vehicles, future time information acquired based on the at least three pieces of the vehicle interval information, and position information indicating a target position of the vehicle at a time indicated by the time information.

4. The operation control apparatus according to claim 1, wherein the vehicle interval acquirer acquires, as the vehicle interval information, information indicating a time period required for the succeeding vehicle to arrive at a position of the preceding vehicle.

5. The operation control apparatus according to claim 1, further comprising:
- a position information acquirer that acquires position information on each of the plurality of vehicles;
- an acquirer that acquires, for each of the plurality of vehicles, arrival time period information on a time period required for the vehicle to arrive at a stop point among the stop points existing forward of the vehicle; and
- a second transmitter configured to be able to transmit the arrival time period information to an information terminal owned by a user of the vehicle.

6. The operation control apparatus according to claim 1, wherein the vehicle interval acquirer acquires the time period of the stop for which the preceding vehicle at the stop point when the preceding vehicle is stopping at the stop point, and the time period of the stop of the succeeding vehicle at the stop point when the succeeding vehicle is stopping at the stop point.

7. A vehicle comprising:
- a transmitter that transmits current position information to an operation control apparatus for a plurality of vehicles traveling in a self-driving manner on a cyclic route having a plurality of stop points, the operation control apparatus including a vehicle interval acquirer that acquires vehicle interval information between a preceding vehicle that is a preceding one of the vehicles and a succeeding vehicle that is one of the vehicles succeeding the preceding vehicle, based on a time period of a stop of the preceding vehicle at a stop point among the stop points and a distance from the succeeding vehicle to the stop point when the preceding vehicle is stopping at the stop point, and based on a time period of a stop of the succeeding vehicle at a stop point among the stop points, a standard time period of a stop preset for the stop point, and a distance from the stop point to the preceding vehicle when the succeeding vehicle is stopping at the stop point; and
- a receiver that receives, from the operation control apparatus, future time information acquired based on the vehicle interval information, and position information indicating a target position at a time indicated by the time information.

8. The vehicle according to claim 7, further comprising a controller that generates a control instruction for movement based on the time information and the position information.

9. The vehicle according to claim 7, wherein the vehicle interval acquirer acquires the time period of the stop for which the preceding vehicle at the stop point when the preceding vehicle is stopping at the stop point, and the time period of the stop of the succeeding vehicle at the stop point when the succeeding vehicle is stopping at the stop point.

* * * * *